(12) United States Patent
Kobayashi et al.

(10) Patent No.: US 12,458,301 B2
(45) Date of Patent: Nov. 4, 2025

(54) X-RAY CT APPARATUS AND HIGH-QUALITY IMAGE GENERATION DEVICE

(71) Applicant: FUJIFILM Healthcare Corporation, Kashiwa (JP)

(72) Inventors: Kana Kobayashi, Chiba (JP); Taiga Goto, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 330 days.

(21) Appl. No.: 18/144,281

(22) Filed: May 8, 2023

(65) Prior Publication Data

US 2023/0363724 A1 Nov. 16, 2023

(30) Foreign Application Priority Data

May 11, 2022 (JP) ................. 2022-078043

(51) Int. Cl.
*A61B 6/03* (2006.01)
*G06T 11/00* (2006.01)

(52) U.S. Cl.
CPC .............. *A61B 6/03* (2013.01); *G06T 11/005* (2013.01)

(58) Field of Classification Search
CPC ......... A61B 6/03; A61B 6/032; A61B 6/5205; A61B 6/4411; A61B 6/5211; A61B 6/5258; A61B 6/54; G06T 11/005; G06T 2207/10081; G06N 20/00

See application file for complete search history.

(56) References Cited

U.S. PATENT DOCUMENTS

| | | | |
|---|---|---|---|
| 7,706,497 B2 | 4/2010 | Hsieh et al. | |
| 2018/0018757 A1* | 1/2018 | Suzuki | G06N 3/045 |
| 2019/0180482 A1 | 6/2019 | Takahashi et al. | |

FOREIGN PATENT DOCUMENTS

| | | |
|---|---|---|
| JP | 4731151 B2 | 7/2011 |
| JP | 6713860 B2 | 6/2020 |
| JP | 2020-166813 A | 10/2020 |

* cited by examiner

*Primary Examiner* — Courtney D Thomas
(74) *Attorney, Agent, or Firm* — Paul Teng

(57) ABSTRACT

Provided is an X-ray CT apparatus including a learned model generated by acquiring one or more learning data sets from one imaging without increasing exposure of a subject, and performing machine learning using the acquired learning set. The learned model is a model after learning in which a low-quality image is input data and a high-quality image is training data. The low-quality image and the high-quality image are obtained based on the same learning measurement data or learning projection data obtained by logarithmically converting the learning measurement data. The low-quality image is a CT image reconstructed from partial data obtained by dividing the learning measurement data or the learning projection data, and the high-quality image is a CT image obtained by reconstructing the learning projection data.

12 Claims, 11 Drawing Sheets

FIG. 10 DURING LEARNING OF MODEL

X-RAY CT APPARATUS AND HIGH-QUALITY IMAGE GENERATION DEVICE

BACKGROUND OF THE INVENTION

1. Field of the Invention

The present invention relates to an X-ray CT apparatus that includes a learned model by machine learning and can display an image with low noise and high image quality.

2. Related Art

An X-ray CT apparatus reconstructs a tomographic image of a subject (hereinafter referred to as a "CT image") by using projection data from a plurality of angles obtained by rotating around the subject an X-ray source that irradiates the subject with X-rays and an X-ray detector that detects an X-ray dose transmitted through the subject as the projection data, and displays the reconstructed CT image. The image displayed by the X-ray CT apparatus depicts a shape of an organ in the subject, and is used for image diagnosis.

In the X-ray CT apparatus, since the X-rays are used for imaging, exposure of the subject is one of problems. A noise amount and an exposure amount are in a conflicting relationship, and there is a problem that the exposure increases when noise is reduced in order to improve diagnostic accuracy.

As a technique for reducing the noise without increasing the exposure, an adaptive filter, successive approximation reconstruction, and the like are commercialized. However, the adaptive filter has a problem of blurring of a subject structure accompanying the noise reduction. Since the successive approximation reconstruction is an iterative process, an enormous amount of time is generally required for calculation, and an expensive calculator is required to solve it. In addition, the image quality may be uncomfortable due to a reduction in spatial resolution for a low contrast body and a change in noise texture.

Therefore, in recent years, attention is focused on a noise reduction technique and an image quality improvement technique using machine learning including deep learning. Here, when noise reduction using machine learning is performed, at least a high-quality image (training data) having less noise than data to be corrected to reduce noise is necessary in addition to the data to be corrected. Hereinafter, a data set necessary for learning including at least one piece of data to be corrected and at least one piece of training data will be referred to as one "learning data set".

The noise reduction using machine learning has a problem that it is difficult to prepare a learning data set while a high effect can be expected.

A method in the related art and a problem for acquiring one learning data set will be described below.

As one of typical methods, there is a method in which an image captured at a low dose is set as data to be corrected, and an image captured at a high dose is set as training data. In addition, Patent Literature 1 describes a method in which the same place is repeatedly imaged, an image before superimposition processing is performed is set as data to be corrected (low-quality image), and an image after the superimposition processing is performed is set as training data (high-quality image). However, since in these methods, the same subject is imaged at least twice, in a case of the X-ray CT apparatus, it is not preferable from a viewpoint of the exposure. In general, when imaging is performed a plurality of times, positions of structures such as a surface of the subject, bones, organs, blood vessels, and tumors in the subject do not completely coincide with each other due to posture deviation of the subject, body motions such as breathing and peristalsis, deviation of an X-ray focal position, a difference in imaging start angle, and differences in device conditions such as bed position accuracy. An image including positional deviation is not ideal training data, and in machine learning using such training data, a structure that is not supposed to be originally present may be produced or a structure may be deleted or blurred. In this way, a learning data set including positional deviation due to deviation of an imaging timing is not preferable.

As another method, there is a method in which an image generated by a filter correction back-projection method is set as data to be corrected, and a low-noise image generated by successive approximation reconstruction is set as training data. However, in the image generated by the successive approximation reconstruction, a frequency spectrum of noise is shifted to a low frequency, and the spatial resolution for a low contrast body tends to decrease and the noise texture tends to change. In this way, the image generated by the successive approximation reconstruction is not always ideal, and a learning data set using different reconstruction methods is not preferable.

As another method, Patent Literature 1 describes a method of generating data to be corrected by adding a first noise component modeled by Gaussian noise or the like and generating training data by adding a second noise component to the same image. Patent Literature 1 discloses that, for example, in a case of an optical coherence tomography (OCT) device, noises are estimated based on data obtaining by imaging in a state in which a model eye or a subject eye is not placed and the estimated noises can be used as a noise model, and that in a case of an OCT angiography (OCTA) device, noise that appears in a range of a non-blood vessel region (FAZ) or noise that appears in an image obtained by imaging a model eye that schematically reproduces a flow of blood can be used as a noise model.

CITATION LIST

Patent Literature

PTL 1: JP2020-166813A

SUMMARY OF THE INVENTION

When the method of generating the data to be corrected and the training data by adding the modeled noise to the image in Patent Literature 1 is applied to a CT image, it is necessary to reproduce an influence of electrical circuit noise of a data collection device of an X-ray CT apparatus, but it is difficult to reproduce the influence of the electrical circuit noise. On the other hand, when virtually generated noise is added to the image, actual noise may be underestimated or overestimated. Therefore, it is difficult to generate the data to be corrected and the training data of the CT image by the method of adding the modeled noise to the image in Patent Literature 1.

In this way, in order to perform machine learning, it is necessary to prepare thousands to hundreds of thousands of learning data sets, but in a case of an X-ray CT apparatus, it is difficult to prepare ideal learning data sets.

An object of the invention is to obtain one or more learning data sets from one imaging without increasing exposure of a subject, perform machine learning using the acquired learning set to generate a learned model, and mount the learned model on an X-ray CT apparatus.

In order to solve the above problems, an X-ray CT apparatus according to the invention includes: a scan gantry unit configured to rotate an X-ray source and an X-ray detector around a subject in a state in which the X-ray source and the X-ray detector face each other with the subject interposed therebetween, and acquire measurement data output by the X-ray detector by detecting X-rays emitted from the X-ray source and transmitted through a subject; an image reconstruction unit configured to generate a CT image of the subject by using the measurement data; and a high-quality image generation unit. The high-quality image generation unit includes a learned model and obtains a high-quality image output by the learned model by receiving the CT image reconstructed by the image reconstruction unit and inputting the CT image to the learned model. The learned model is a model after learning in which at least one low-quality image generated in advance is input data, and at least one high-quality image higher in image quality than the low-quality image is training data. The low-quality image and the high-quality image are obtained based on the same learning measurement data or learning projection data obtained by logarithmically converting the learning measurement data. The learning measurement data is data output by a learning X-ray detector by detecting X-rays emitted from a learning X-ray source and transmitted through a learning subject, the learning X-ray source and the learning X-ray detector being rotated around the learning subject in a state in which the learning X-ray source and the learning X-ray detector face each other with the learning subject interposed therebetween. The low-quality image is a CT image reconstructed from partial data obtained by dividing the learning measurement data or the learning projection data, and the high-quality image is a CT image obtained by reconstructing the learning projection data.

According to the invention, since one or more learning data sets can be acquired from one imaging without increasing exposure of a subject and machine learning can be performed using the acquired learning data set to generate a learned model, an X-ray CT apparatus that can reduce noise with high accuracy can be provided.

DESCRIPTION OF THE PREFERRED EMBODIMENTS

An X-ray CT apparatus according to an embodiment of the invention will be described with reference to the drawings.

Configuration of X-Ray CT Apparatus

First, the X-ray CT apparatus according to the present embodiment will be described with reference to the drawings.

Figure 1:
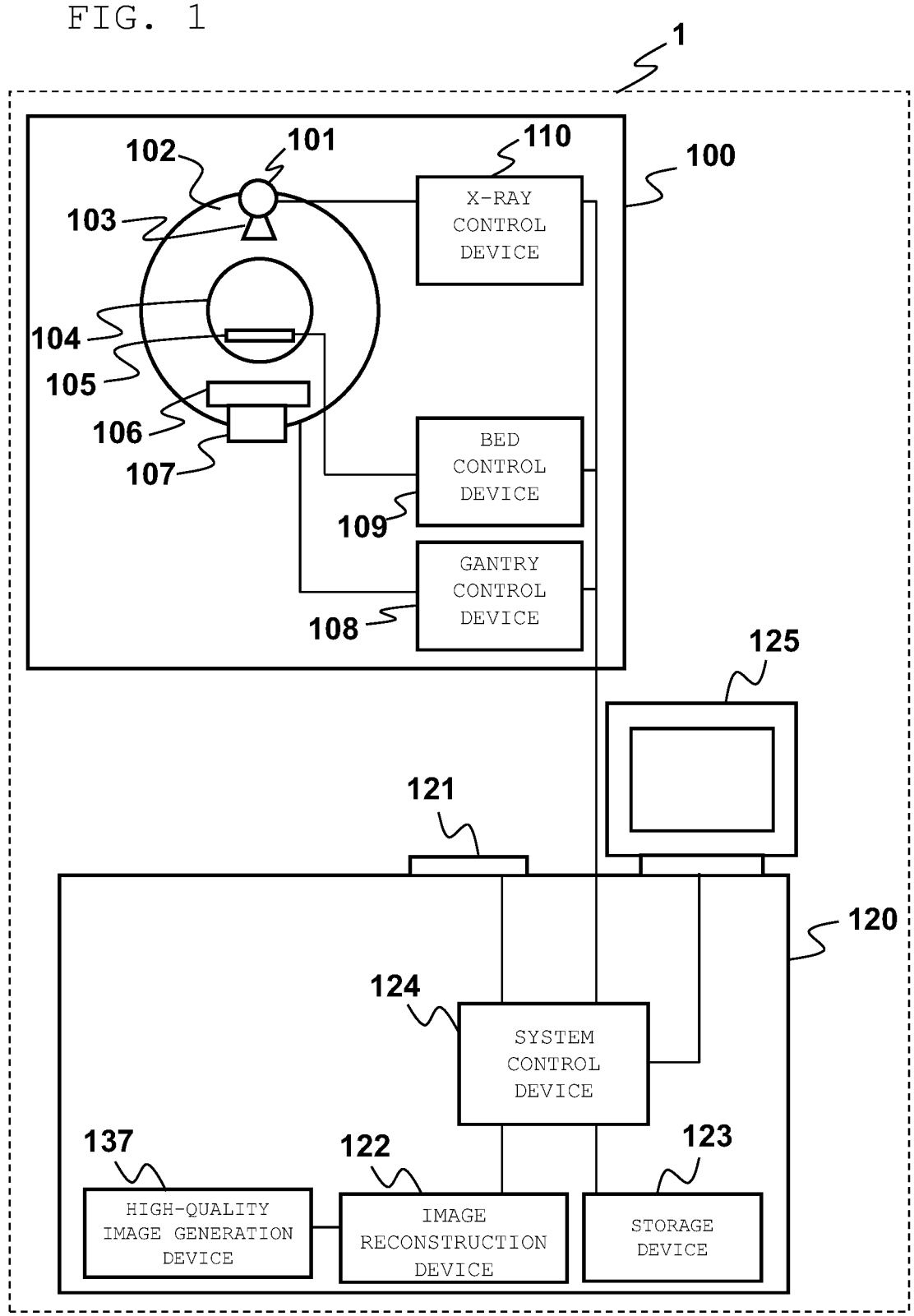
FIG. 1 is a block diagram illustrating an overall configuration of an X-ray CT apparatus according to an embodiment.

FIG. 1 is an overall configuration diagram of an X-ray CT apparatus 1 to which the invention is applied. The X-ray CT apparatus 1 includes a scan gantry unit 100 and a console 120.

The scan gantry unit 100 includes an X-ray source 101, a rotary disk 102, a collimator unit 103, a bed 105, an X-ray detector 106, a data collection device 107, a gantry control device 108, a bed control device 109, and an X-ray control device 110.

The rotary disk 102 includes an opening 104 into which a subject placed on the bed 105 enters, is equipped with the X-ray source 101, the X-ray detector 106, and the data collection device 107, and rotates around an imaging region where the subject is placed.

The X-ray detector 106 is a device that faces the X-ray source 101 and measures spatial distribution of X-rays transmitted through the subject by detecting the transmitted X-rays for each rotation angle (view). The X-ray detector 106 includes, for example, about 1000 groups of X-ray detection elements including, for example, a combination of a scintillator and a photodiode, in a rotation direction (channel direction) of the rotary disk 102, and for example, about 1 to 320 groups in a rotation axis direction (column direction).

The data collection device 107 is a device that collects an X-ray dose detected by the X-ray detector 106, converts the X-ray dose into digital data, and sequentially outputs the digital data to the image reconstruction device 122. The gantry control device 108 is a device that controls rotation of the rotary disk 102. The bed control device 109 is a device that controls upward, downward, leftward, rightward, forward, and rearward movements of the bed 105. The X-ray control device 110 is a device that controls power input to the X-ray source 101.

The console 120 includes an input device 121, an image reconstruction device 122, a high-quality image generation device 137, a display device 125, a storage device 123, and a system control device 124.

The input device 121 is a device for inputting subject names, examination dates and times, imaging conditions, and the like, and is specifically a keyboard, a pointing device such as a mouse, various switch buttons, and the like. The input device 121 may be a touch panel type input device configured integrally with a display screen of the display device 125.

The image reconstruction device 122 is a device that acquires measurement data sent from the data collection device 107 and performs calculation processing to reconstruct a CT image.

The display device 125 is a device that is connected to the system control device 124 and displays the CT image reconstructed by the image reconstruction device 122 and various kinds of information handled by the system control device 124. The display device 125 includes a display device such as a liquid crystal panel or a CRT monitor, and a logic circuit for executing display processing in cooperation with the display device.

The storage device 123 is a device that stores the measurement data collected by the data collection device 107 and/or projection data described later, and image data of the CT image created by the image reconstruction device 122. Specifically, the storage device 123 is a data recording device such as a hard disk drive (HDD) or a solid state drive (SSD).

The system control device 124 is a device that controls the above devices in the console 120, the gantry control device 108, the bed control device 109, and the X-ray control device 110. The system control device 124 is a computer including a central processing unit (CPU), a graphics processing unit (GPU), a read only memory (ROM), a random access memory (RAM), and the like.

A structure of the high-quality image generation device 137 will be described in first to fourth embodiments described later.

In the X-ray CT apparatus configured as described above, the X-ray control device 110 controls the power input to the X-ray source 101 based on the imaging conditions received from the input device 121, in particular, an X-ray tube voltage, an X-ray tube current, and the like. Accordingly, the X-ray source 101 irradiates the subject with X-rays according to the imaging conditions. The X-ray detector 106 detects X-rays emitted from the X-ray source 101 and transmitted through the subject with a large number of X-ray detection elements, and measures distribution of the transmitted X-rays. The rotary disk 102 is controlled by the gantry control device 108, and rotates, for example, at a rotation speed of about 0.2 seconds to 2 seconds per rotation based on the imaging conditions received from the input device 121. The bed 105 is controlled by the bed control device 109. Examples of a known scan type include an "axial scan" in which the bed is not moved during the X-ray irradiation, and a "helical scan" in which the bed is moved during the X-ray irradiation.

By repeating the X-ray irradiation from the X-ray source 101 and the measurement of the transmitted X-ray distribution by the X-ray detector 106 as the rotary disk 102 rotates, measurement data from various angles (views) is acquired by the data collection device 107. The measurement data is transmitted from the data collection device 107 to the image reconstruction device 122. The image reconstruction device 122 performs logarithmic conversion on the input measurement data, and converts the measurement data into "projection data". In addition, the image reconstruction device 122 obtains a CT image by performing back-projection processing on the projection data.

The high-quality image generation device 137 receives the CT image and makes the CT image a high-quality image. The high-quality CT image is displayed on the display device 125.

The CT image is a set of one or more cross-sectional images, and a position of the cross-sectional image is referred to as a "cross-sectional position" in the following description.

FIRST EMBODIMENT

Configuration of X-ray CT Apparatus According to First Embodiment

Figure 2:
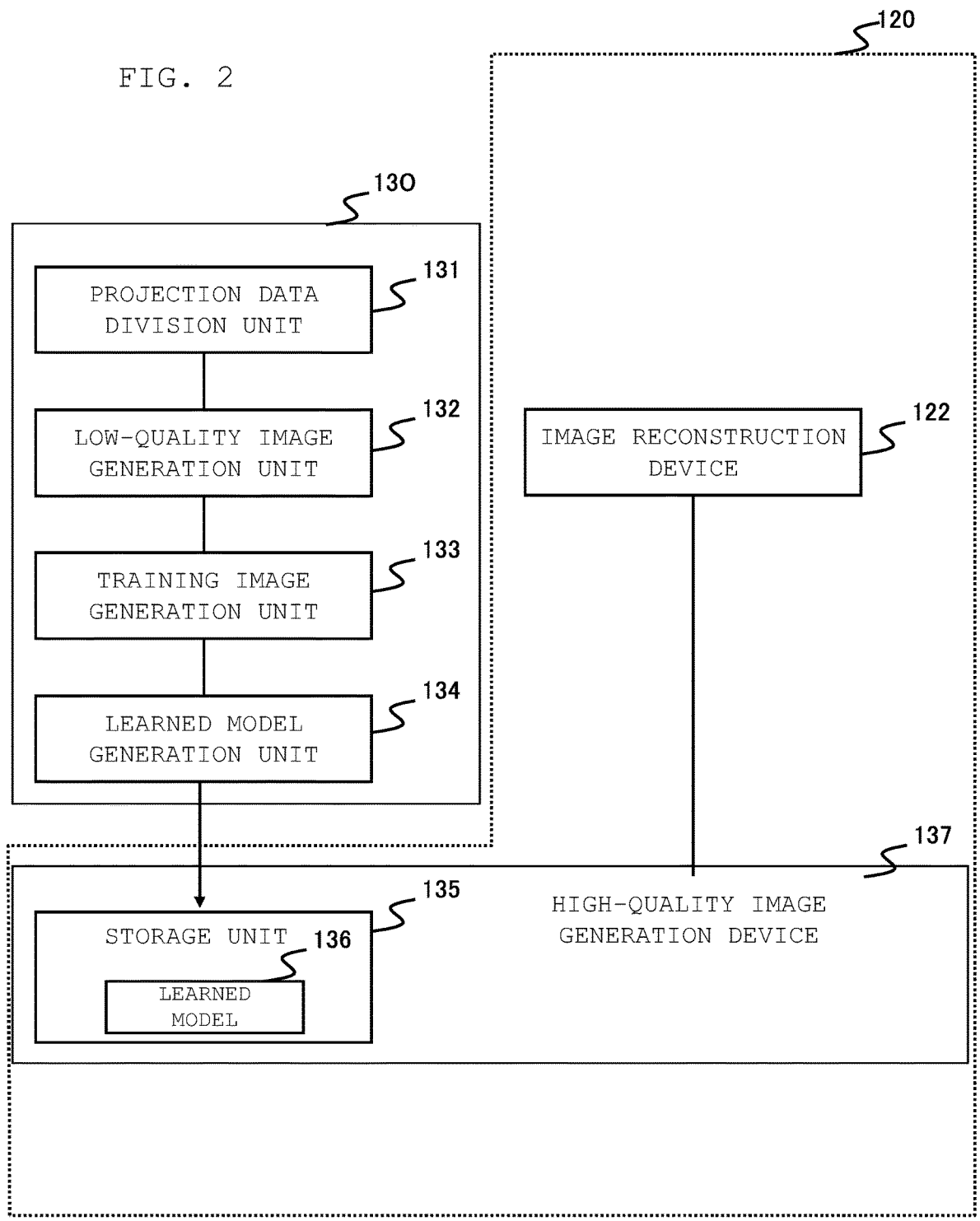
FIG. 2 is a block diagram illustrating configurations of a learned model generation device 130, an image reconstruction device 122, and a high-quality image generation device 137 according to a first embodiment.

A configuration of an X-ray CT apparatus according to a first embodiment of the invention will be further described with reference to FIG. 2.

As described above, the console 120 includes the image reconstruction device 122 and the high-quality image generation device 137. A storage unit 135 is disposed in the high-quality image generation device 137, and a learned model is stored in advance in the storage unit 135.

The image reconstruction device 122 receives the measurement data from the data collection device 107, performs logarithmic conversion to obtain the projection data, and performs back-projection processing on the projection data to generate the CT image.

The high-quality image generation device 137 receives the CT image reconstructed by the image reconstruction device 122, reads the learned model 136 stored in the storage unit 135, and inputs the learned model 136 to a learning model, thereby obtaining an image output by the learned model 136. The image output by the learned model 136 has reduced noise and higher image quality than the input CT image. This image is displayed on the display device 125.

Any model may be used as long as it is a machine learning model, and for example, a known convolutional neural network (CNN) can be used. The CNN includes an input layer for inputting at least one image, an intermediate layer, and an output layer for outputting at least one image.

The learned model 136 is generated by a learned model generation device 130. The learned model generation device 130 is generated by using a projection data division unit 131, a low-quality image generation unit 132, a training image generation unit 133, and a learned model generation unit 134.

The learned model 136 is a learned model generated by using a learning data set in which at least one low-quality image generated in advance is used as input data and at least one high-quality image higher in image quality than the low-quality image is used as training data. During model generation (machine learning), thousands to hundred thousands of learning data sets are used.

Here, the low-quality image and the high-quality image are obtained based on the same learning measurement data or learning projection data obtained by logarithmically converting the learning measurement data. The learning measurement data is data obtained by a learning X-ray detector by detecting X-rays emitted from a learning X-ray source and transmitted through a learning subject, by rotating the learning X-ray source and the learning X-ray detector around the learning subject in a state in which the learning X-ray source and the learning X-ray detector face each other with the learning subject interposed therebetween.

The low-quality image is a CT image reconstructed from partial data obtained by dividing the learning measurement data or the learning projection data. The high-quality image is a CT image obtained by combining a plurality of low-quality images or a CT image obtained by directly reconstructing the learning projection data. The low-quality image and the high-quality image are images at the same cross-sectional position.

As described above, in the first embodiment, since a low-quality image and a high-quality image can be generated from the same learning measurement data or learning projection data, learning data sets (low-quality image and high-quality image) with different noise amounts and artifacts and without a time lag can be easily obtained from one imaging without increasing exposure of the learning subject.

Since the low-quality image is reconstructed from the partial data obtained by dividing the learning measurement data or the learning projection data, the low-quality image is equivalent to an image reconstructed from projection data obtained by acquiring the measurement data with the substantially small number of samplings and logarithmically converting the measurement data into the projection data. Therefore, the low-quality image is an image with greater noise. On the other hand, since the high-quality image is a high-quality image obtained by reconstructing the learning projection data having the large number of samplings, the high-quality image includes less noise. Therefore, the learned model 136 generated by machine learning of the model using the low-quality image as the input data and the high-quality image as the training data has a high noise reduction effect and an effect of reducing an artifact that is caused by insufficient sampling.

The projection data acquired by the scan gantry unit 100 of the X-ray CT apparatus in which the learned model 136 is stored, or projection data acquired by another X-ray CT apparatus may be used as the learning projection data.

Figure 3:
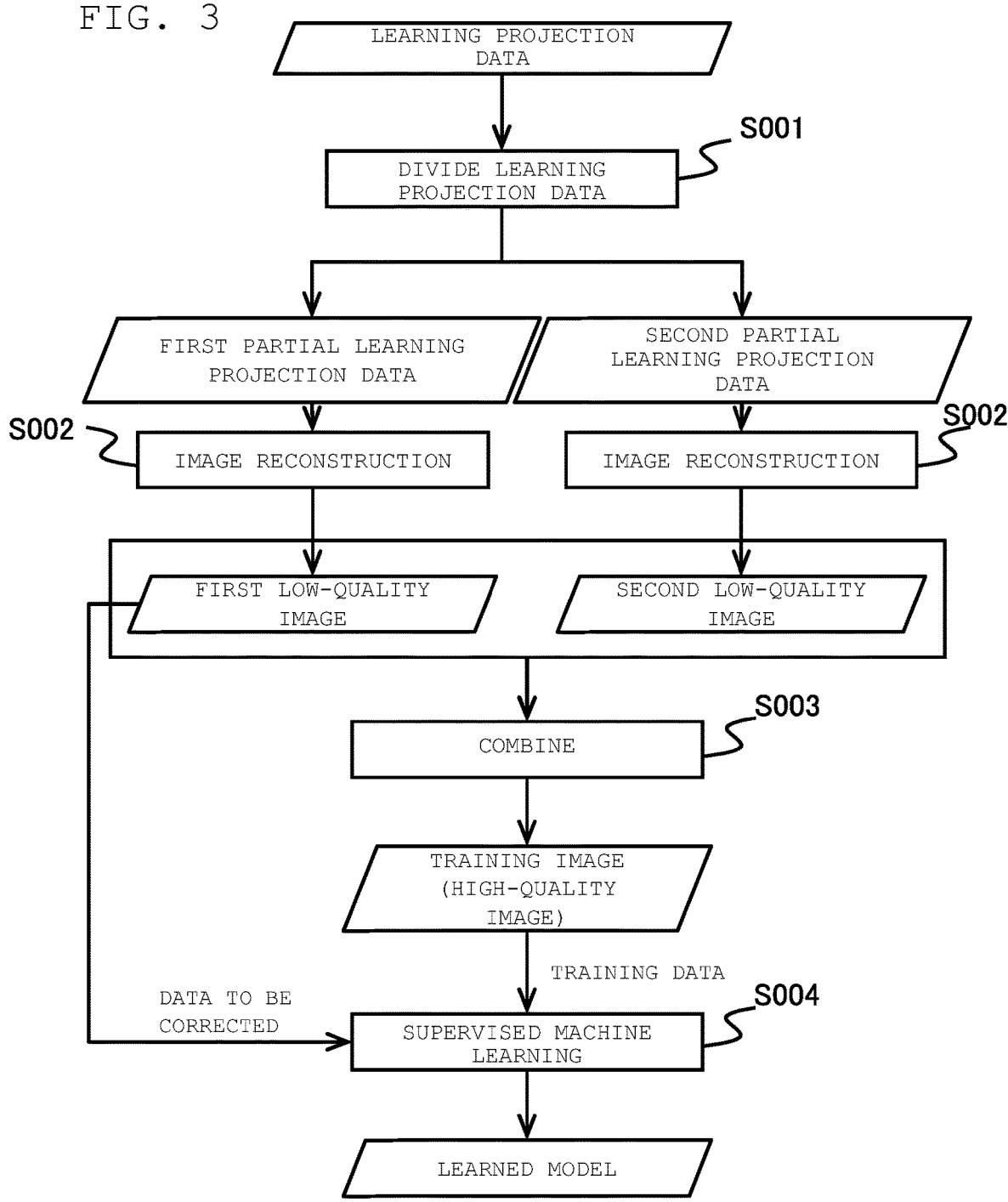
FIG. 3 is a flowchart illustrating a flow of processing during learning of a model of an X-ray CT apparatus according to the first embodiment.

Hereinafter, an example in which a low-quality image is obtained by reconstructing data obtained by dividing the learning projection data (hereinafter referred to as partial learning projection data) will be described in detail with reference to FIGS. 2 and 3. When the learning measurement data is divided, the partial learning projection data can be obtained by logarithmically converting the divided learning measurement data.

The learned model generation device 130 receives the projection data acquired by the scan gantry unit 100 of the X-ray CT apparatus in which the learned model 136 is stored, or the projection data acquired by another X-ray CT apparatus.

The projection data division unit 131 divides the learning projection data into a plurality of pieces of partial projection data. For example, partial data (partial learning projection data) is extracted from the learning projection data in any one of a view direction, a column direction, and a channel direction of the learning X-ray detector.

The low-quality image generation unit 132 reconstructs a low-quality CT image (low-quality image) from the partial learning projection data.

Here, the low-quality image generation unit 132 generates a low-quality image for each of a plurality of pieces of divided partial projection data. Accordingly, a plurality of low-quality images at the same cross-sectional position are generated. The training image generation unit 133 generates a high-quality image (training image) by combining the plurality of low-quality images. A high-quality image (training image) may be reconstructed directly from the learning projection data. However, by generating the high-quality image (training image) by combining the plurality of low-quality images after generating a low-quality image for each of the plurality of pieces of divided partial projection data in this way, a set of a high-quality image (training image) and a low-quality image can be generated in a short time as compared to a case where the high-quality image (training image) is reconstructed from non-divided learning projection data. This is because an image reconstruction time increases as a data amount of the projection data increases.

The learned model generation unit 134 generates at least one learned model 136 by performing supervised machine learning using a learning data set in which any one of the low-quality images is used as data to be corrected (input data) and the high-quality image (training image) is used as training data.

All or a part of the processing of the units 131 to 134 in the learned model generation device 130 may be performed in the X-ray CT apparatus 1. In addition, the processing of the units 131 to 134 in the learned model generation device 130 may be performed using a personal computer including a processor such as a CPU and a GPU, a cloud environment, or the like. Since the machine learning of the learned model generation unit 134 requires a large amount of calculation and requires expensive computational resources such as a CPU and a GPU, it is preferable that the machine learning is performed in advance in a high-performance calculation environment, and products are mounted on the X-ray CT apparatus 1.

Hereinafter, a process in which the units 131 to 134 in the learned model generation device 130 generate the learned model is referred to as "during learning", and a process in which the high-quality image generation device 137 generates the high-quality image by using the learned model 136 is referred to as "during application" of the X-ray CT apparatus.

Operations During Learning of Learned Model Generation Device 130 According to First Embodiment Operations during learning of the learned model generation device 130 according to the first embodiment will be described with reference to a flow in FIG. 3.

In the first embodiment, the learned model generation device 130 is implemented by software. That is, the learned model generation device 130 includes a processor such as a central processing unit (CPU) or a graphics processing unit (GPU), and a memory, and the CPU reads and executes programs stored in the memory, thereby implementing functions of the units of the learned model generation device 130. In addition, a part or all of the learned model generation device 130 may be implemented by hardware. For example, a circuit design may be performed such that the functions of the units of the learned model generation device 130 are implemented by using a custom IC such as an application specific integrated circuit (ASIC) or a programmable IC such as a field-programmable gate array (FPGA).

Step S001

First, in step S001, the projection data division unit 131 divides the learning projection data acquired by the X-ray CT apparatus 1 or another X-ray CT apparatus into a plurality of pieces of partial learning projection data. Specifically, for example, in any one of a view number (rotation angle), a column number, and a channel number, the projection data division unit 131 distributes learning projection data with relatively close numbers to separate partial learning projection data. Accordingly, the projection data division unit 131 generates a plurality of pieces of partial learning projection data at the same imaging timing and the same cross-sectional position.

A case is considered where, for example, when dividing the learning projection data by the view number, the learning projection data whose number of views is I and view number is i=0, 1, 2, ..., I–1 is divided into two including first partial learning projection data whose number of views is a and second partial learning projection data whose number of views is b. A case where I is an even number will be described as an example. As one of division methods, for example, a method of dividing the learning projection data into an even view number of i=0, 2, 4, ..., I–2 (number of views a=I/2) and an odd view number of i=1, 3, 5, ..., I–1 (number of views b=I/2) is used. In a case where I is an odd number, the number of the even view numbers is larger by one view, and the same division may be performed. The division method of the even view and the odd view in this way is hereinafter referred to as "even-odd division".

A case where the number of views I is a multiple of 3 will be described as an example. As another division method, the learning projection data may be divided into a view number of i=0, 3, 6, ..., I–3 (number of views a=I×⅓) and a view number of i=1, 2, 4, 5, 7, 8, ..., I–2, I–1 (number of views b=I×⅔). Accordingly, the learning projection data can be divided into uneven first and second divided learning projection data in which a ratio of the number of views is 1:2. When the number of views is not a multiple of 3, one will increase by one view, and the same division may be performed. The ratio of the number of views of the first and second divided learning projection data is 2:1, 1:3, 2:3, or the like. Hereinafter, the method of unevenly dividing the learning projection data in this way will be referred to as "uneven division".

In the above example, the projection data division unit 131 divides the learning projection data into two in the view direction, and may divide the learning projection data into three or more. In addition, the projection data division unit 131 may divide the learning projection data in the column direction and the channel direction.

Step S002

Next, in step S002, the low-quality image generation unit 132 reconstructs a first low-quality image and a second low-quality image from the first partial learning projection data and the second partial learning projection data. Accordingly, two low-quality images at the same cross-sectional position are obtained. In the image reconstruction, the low-quality image generation unit 132 uses, for example, a known filter correction back-projection method or a convolution correction back-projection method.

Step S003

Next, in step S003, the first low-quality image and the second low-quality image at the same cross-sectional position are combined to generate a training image. As a combining method, a weighted average method of weighting pixel values of pixels at corresponding positions of the first low-quality image and the second low-quality image by, for example, a variance value or a data amount can be used.

The weighted average method will be described using specific equations. In the image reconstruction in linear processing such as the filter correction back-projection method, the data amount and the variance value of the image (square value of image noise) are inversely proportional.

Therefore, variance values $\sigma_1^2$ and $\sigma_2^2$ of the first low-quality image and the second low-quality image at a certain cross-sectional position are expressed by Equations 1 and 2, respectively, based on a ratio of a projection data amount.

$$\sigma_1^2=(a+b)/a\times\sigma^2 \qquad \text{(Equation 1)}$$

$$\sigma_2^2=(a+b)/b\times\sigma^2 \qquad \text{(Equation 2)}$$

Here, a is the number of views of the first partial learning projection data, and b is the number of views of the second partial learning projection data. $\sigma^2$ is a variance value of an image when reconstruction is performed using the total number of views I (=a+b).

By using the variance values $\sigma_1^2$ and $\sigma_2^2$, the pixel values of the first low-quality image and the second low-quality image are weighted and averaged by Equations 3 to 5.

$$\text{(first low-quality image)}\times k_1+\text{(second low-quality image)}\times k_2=\text{(training image)} \qquad \text{(Equation 3)}$$

Here, $$k_1=\sigma_2^2/(\sigma_1^2+\sigma_2^2)=a/(a+b) \qquad \text{(Equation 4)},$$

$$k_2=\sigma_1^2/(\sigma_1^2+\sigma_2^2)=b/(a+b) \qquad \text{(Equation 5)}$$

As in Equations 3 to 5, the weight of the pixel value of the low-quality image having a small data amount and a higher variance value is reduced. When a=b, (Equation 3) is equal to addition average.

At this time, a variance value $\sigma_3^2$ of the training image is expressed by the following Equation 6.

$$\sigma_3^2=\sigma_1^2\times k_1^2+\sigma_2^2\times k_2^2=\sigma^2 \qquad \text{(Equation 6)}$$

Comparing (Equation 1), (Equation 2), and (Equation 6), the image noise of a high-quality image (training image) obtained by the image combining is smaller than that of the first low-quality image and the second low-quality image.

Although an example in which two low-quality images are combined was described here, three or more low-quality images may also be combined in the same manner.

In this way, a set of a high-quality image and a low-quality image having higher noise than the high-quality image can be easily obtained. In the present embodiment, since the high-quality image is obtained by reconstructing the first and second partial learning projection data having a small data amount to obtain the first low-quality image and the second low-quality image and combining the first low-quality image and the second low-quality image, a reconstruction time required to obtain the high-quality image and the low-quality image is proportional to a+b. When the high-quality image is reconstructed from the learning projection data that is not divided, the reconstruction time required to obtain the high-quality image and the low-quality image is proportional to I+a or I+b, and is longer than that in the present embodiment. Therefore, in the present embodiment, a set of the training image and the low-quality image can be obtained in a shorter time.

Further, features of the training image will be described. It is known that, in an X-ray CT apparatus, when sampling in a view direction, a column direction, and a channel direction is insufficient, a streak artifact, a partial volume effect, and an aliasing artifact will be generated, respectively. It can be said that the first partial learning projection data and the second partial learning projection data is in a state in which thinning of the data amount is performed and the sampling is insufficient. The first low-quality image and the second low-quality image generated based on this include an artifact due to the insufficient sampling. On the other hand, the training image is an image having a sufficient data amount and in which the artifact due to the insufficient sampling is reduced. Therefore, the training image is a high-quality image in which the image noise is low and the artifact due to the insufficient sampling is reduced.

The training image may be reconstructed from the non-divided learning projection data.

Step S004

Next, in step S004, the learned model generation unit 134 obtains one learning data set by using one of the low-quality images at the same cross-sectional position as the input data and the training image as the training data.

In step S001, when the projection data division unit 131 performs the even-odd division, since the first low-quality image and the second low-quality image are the same, the learned model generation unit 134 may use either one of the first low-quality image and the second low-quality image as the input data. On the other hand, in step S001, when the projection data division unit 131 performs the uneven division, it can be expected that the learned model 136 having a higher noise reduction effect can be obtained by using a low-quality image having the larger image noise among the first low-quality image and the second low-quality image as the input data. Alternatively, a first learned model 136 may be generated by using the first low-quality image as the input data, a second learned model 136 may be generated by using the second low-quality image as the input data, a plurality of learned models 136 may be obtained, and the learned models 136 may be selectively used during application.

The learned model generation unit 134 uses, for example, the known convolutional neural network (CNN) as a machine learning model. The CNN includes an input layer for inputting at least one image, an intermediate layer, and an output layer for outputting at least one image. The learned model generation unit 134 inputs the input data (low-quality image) to the input layer of the machine learning model and the training data (high-quality image) to the output layer, and the intermediate layer constructs the network (CNN) such that an output image from the output layer approaches the training data, that is, a difference between the output image and the training data decreases. By such machine learning, the learned model 136 for increasing the image quality of the input data is obtained.

The number of images of each of the input data (low-quality image) and the training data (high-quality image) is not limited to one, and for example, three pieces of input data (low-quality image) may be input and one or more images may be output in order to reflect a characteristic amount in a body axis direction. In addition, residual learning based on the CNN may be used.

The learned model generation unit 134 stores the obtained learned model 136 in the storage device 123.

Normally, since one to thousands of cross-sectional images can be acquired from one X-ray CT imaging (one case) of the learning subject, according to the first embodiment, one to thousands of learning data sets can be obtained from one X-ray CT imaging. Therefore, it is not necessary to image the same learning subject a plurality of times in order to obtain the learning data set. Further, by increasing the number of cases, learning data sets having the number of pieces of data necessary for machine learning (for example, thousands to hundreds of thousands) can be obtained. By preparing a large number of learning data sets, a learned model that can reduce noise for various cases and output a high-quality image can be created.

Since machine learning generally performs validation and test after learning, a part of a data learning data set may be used for learning (training), and a part of the data learning data set may be used for validation or testing.

During Application of X-ray CT Apparatus According to First Embodiment

Figure 4:
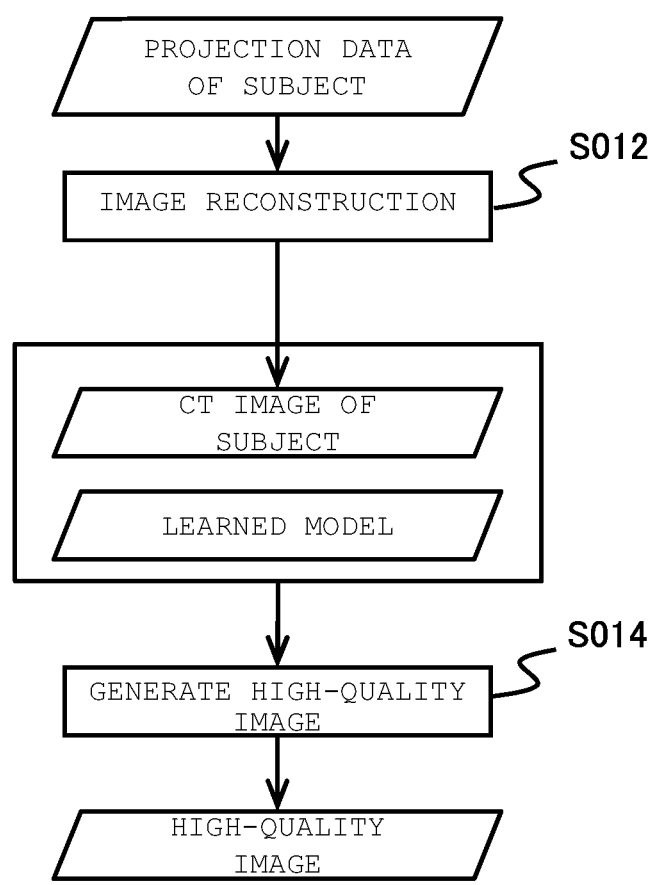
FIG. 4 is a flowchart illustrating a flow of processing during application (imaging) of the X-ray CT apparatus according to the first embodiment.

Operations of the X-ray CT apparatus 1 according to the first embodiment during application (imaging of subject) will be described with reference to the flow of FIG. 4.

Step S012

First, in step S012, the image reconstruction device 122 receives projection data of the subject obtained by the scan gantry unit 100 irradiating the subject with X-rays, reconstructs an image, and generates a CT image of the subject. As an image reconstruction method, for example, the known filter correction back-projection method may be used, or a known successive approximation reconstruction method may be used.

Step S014

Next, in step S014, the high-quality image generation device 137 reads the learned model 136 stored in the storage device 123 in advance, and inputs the CT image of the subject generated in step S012 to the input layer. Accordingly, the learned model 136 outputs, from the output layer, a high-quality image obtained by improving the image quality of the CT image of the subject. The high-quality image generation device 137 displays the high-quality image on the display device 125, and stores the high-quality image in the storage device 123.

As described above, in the first embodiment, a plurality of learning data sets (low-quality image and high-quality image) with different noise amounts and artifacts and without a time lag can be easily obtained from one imaging without increasing exposure of the learning subject. In addition, the low-quality image input as the input data to the learned model 136 is an image with large noise obtained with the substantially small number of samplings, and the high-quality image input as the training data is obtained by reconstructing the learning projection data having the large number of samplings. Therefore, the learned model 136 in these learning data sets has a high noise reduction effect and an effect of reducing an artifact that is caused by insufficient sampling.

SECOND EMBODIMENT

An X-ray CT apparatus according to a second embodiment of the invention will be described.

In the first embodiment, a configuration is provided in which during learning of the learned model 136, the projection data is divided and the low-quality image is used as the input data, whereas during application, the entire projection data of the subject is reconstructed to obtain a CT image without dividing the projection data of the subject, and the obtained CT image is used as the input data of the learned model 136. Therefore, the CT image input to the learned model 136 during application has twice the data amount (in even-odd division) of the low-quality image input during learning, and the data amount of the input data is greatly different between during learning and during application.

When there is a difference in data amount of images used as the input data between during learning and during application, noise reduction performance and artifact reduction performance of the learned model 136 may be not sufficiently exhibited during application, and unexpected deterioration in image quality may occur.

In particular, the streak artifact is affected by the number of views of the projection data. For example, when a CT image reconstructed from projection data in which the number of views is larger than that during learning is used as the input data of the learned model 136 during application, a streak artifact reduction effect may be fairly strong, and deterioration in image quality due to overcorrection may occur in the output data of the learned model 136.

Therefore, an object in the second embodiment is to align data amounts of input data as much as possible between during learning and during application, and the data amount of a CT image input to the learned model 136 during application is reduced to be equal to that of the input data during learning.

Figure 5:
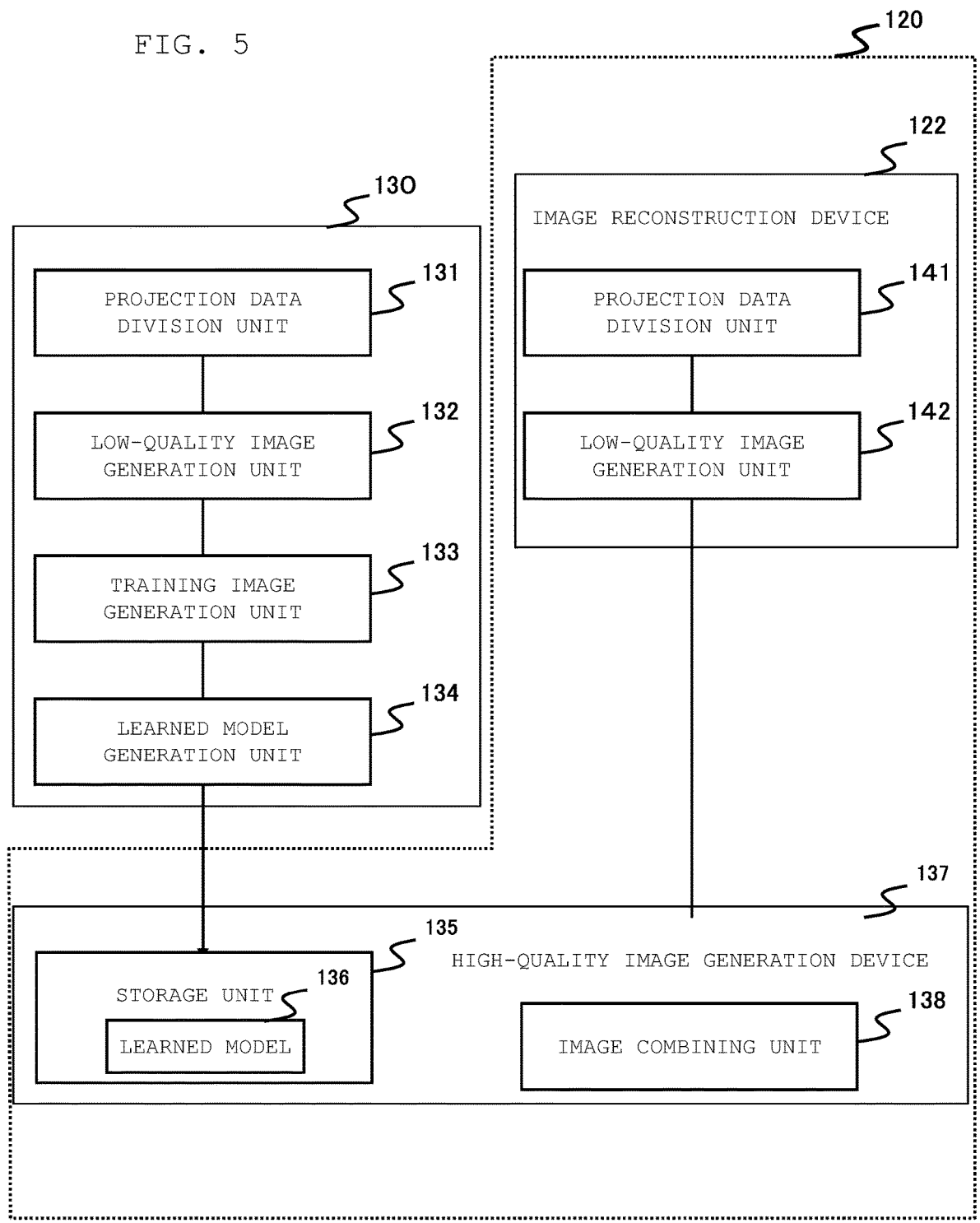
FIG. 5 is a block diagram illustrating configurations of the learned model generation device 130, the image reconstruction device 122, and the high-quality image generation device 137 according to a second embodiment.

Specifically, as illustrated in FIG. 5, the image reconstruction device 122 of the X-ray CT apparatus according to the second embodiment includes a projection data division unit 141 that divides measurement data of a subject or projection data obtained by logarithmically converting the measurement data, and a low-quality image generation unit 142 that reconstructs a CT image (low-quality image) from partial data divided by the projection data division unit 141. For example, the projection data division unit 141 selects partial data from the measurement data or the projection data in any one of a view direction, a column direction, and a channel direction. The low-quality image generation unit 142 generates a reconstructed CT image with the selected partial data.

At this time, it is preferable that the projection data division unit 141 performs the division such that the number of views of partial learning projection data during generation of a learned model is substantially equal to the number of views of partial data divided by the projection data division unit 141 during application. Specifically, the projection data division unit 141 divides the measurement data of the subject or the projection data under the same condition as when learning measurement data or learning projection data is divided during generation of a low-quality image for learning of the learned model. Alternatively, the projection data division unit 141 divides the measurement data of the subject or the projection data such that a data amount included in the low-quality image for learning of the learned model 136 matches a data amount included in the CT image (low-quality image) reconstructed by the low-quality image generation unit 142. These dividing processing will be described in detail later.

The high-quality image generation device 137 inputs the reconstructed CT image (low-quality image) from the partial data divided by the projection data division unit 141 to the learned model 136, thereby obtaining a high-quality image from the learned model 136.

When the data amounts of the input data during learning and during application are aligned even when the measurement data or the projection data is not divided during application (for example, when 2000 views of the projection data are subjected to the even-odd division for each 1000 views and trained during learning and 1000 views of the projection data are handled during application), the first embodiment may be performed, and thus the description will be omitted.

Hereinafter, in the present embodiment, it is assumed that the projection data division unit 141 divides the projection data during application. In addition, the projection data divided by the projection data division unit 141 is referred to as partial projection data.

Configuration of X-ray CT Apparatus According to Second Embodiment

A configuration according to the second embodiment is shown in FIG. 5. A difference from the first embodiment is that the image reconstruction device 122 includes the projection data division unit 141 and the low-quality image generation unit 142. The high-quality image generation device 137 includes an image combining unit 138 in addition to the storage unit 135. The projection data division unit 141 divides the projection data of the subject into a plurality of pieces of partial projection data. The low-quality image generation unit 142 reconstructs a plurality of low-quality images from the partial projection data. The image combining unit 138 generates one image by combining a plurality of high-quality images.

During Application According to Second Embodiment

Two processing methods may be considered for operations during application according to the second embodiment.

First Processing Method

Figure 6:
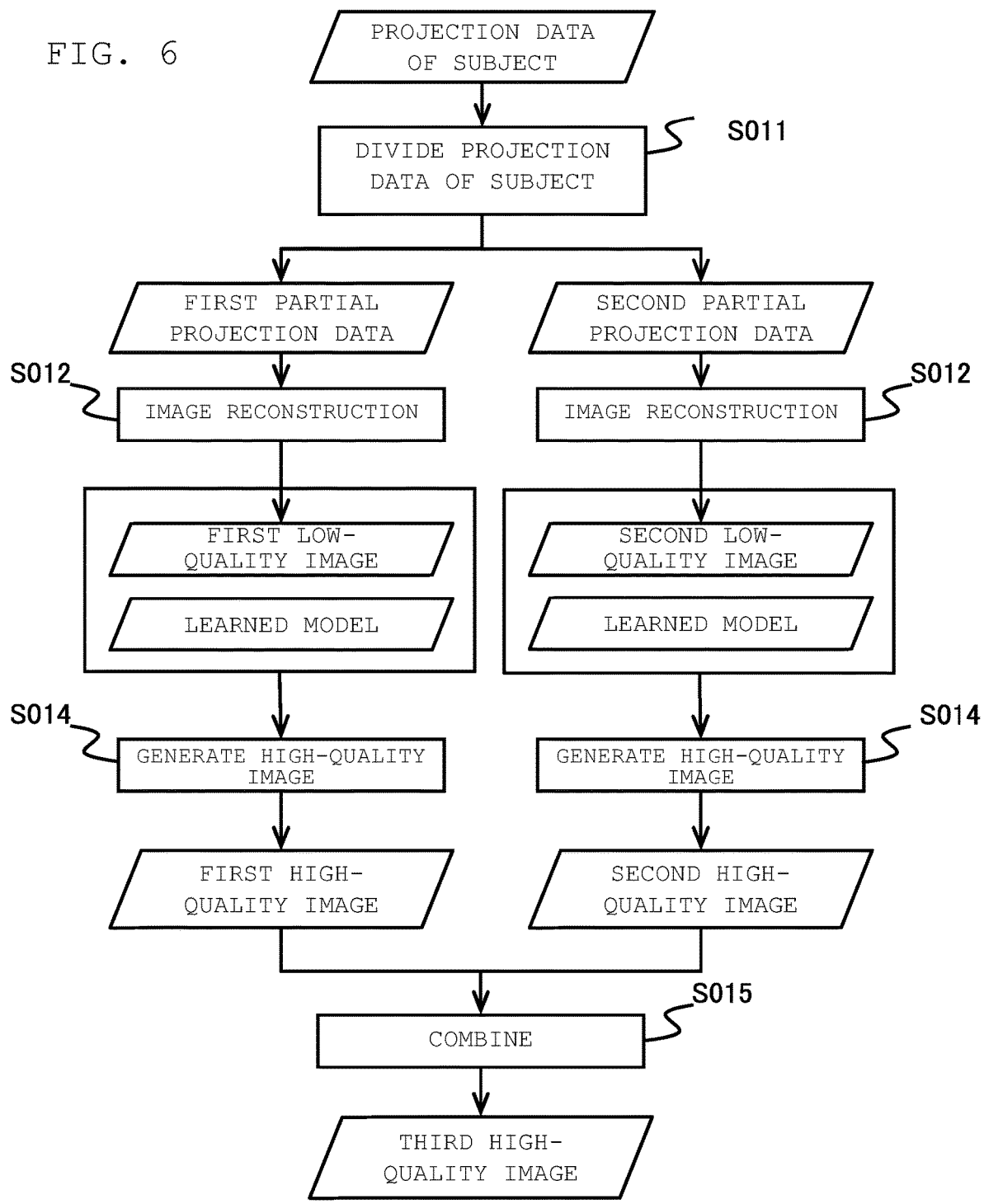
FIG. 6 is a flowchart illustrating a flow of processing by a first processing method during application (imaging) of an X-ray CT apparatus according to the second embodiment.

A first processing method according to the second embodiment will be described with reference to a flow in FIG. 6. In the processing method with reference to the flow in FIG. 6, the projection data of the subject is divided by using the same projection data division method as that during learning.

Step S011

In step S011, the projection data division unit 141 divides the projection data of the subject by the same projection data division method as that during learning of the learned model 136. For example, when the even-odd division is performed during learning, even during application, the even-odd division is performed, and the projection data of the subject is divided into first partial projection data and second projection data. In general, since the number of views I of the learning projection data during learning does not always match the number of views J of the projection data of the subject during application, when the number of views of the projection data of the subject is set as J and the view number is set as j, the projection data is divided (even-odd divided) into an even view number of j=0, 2, 4, ..., J−2, and an odd view number of j=1, 3, 5, ..., J−1. Here, J represents an even number, and the same applies to an odd number.

When the number of views I of the learning projection data during learning and the number of views J of the projection data of the subject during application can be regarded as I≈J, in the second embodiment, the data amounts of the input data during learning and during application can be brought close to each other as compared with the first embodiment in which the division is not performed.

Step S012

In step S012, the low-quality image generation unit 142 performs image reconstruction on the first partial projection data and the second projection data divided in step S011 to obtain a first low-quality image and a second low-quality image.

Step S014

In step S014, the first low-quality image and the second low-quality image are input as the input data of the learned model 136, and a first high-quality image and a second high-quality image with reduced noise, which are output from the learned model 136, are obtained.

Since the data amounts of the low-quality images input as the input data to the learned model 136 during learning and during application are the same, an artifact reduction effect is obtained in the first high-quality image and the second high-quality image as during learning.

Step S015

In step S015, the first high-quality image and the second high-quality image are combined to generate a third high-quality image. As a combining method, for example, weighted average similar to (Equation 3) to (Equation 5) is used.

Second Processing Method

Figure 7:
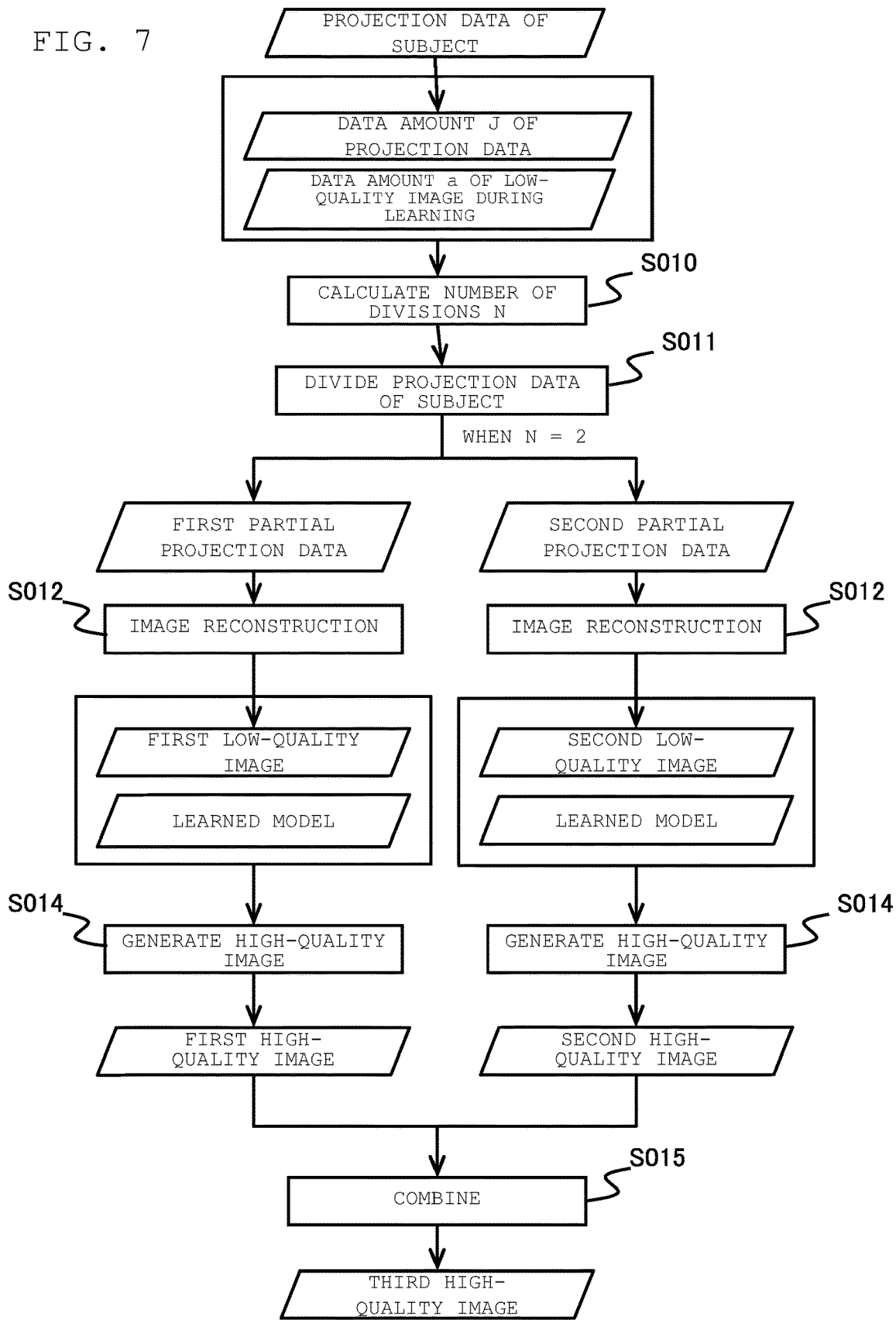
FIG. 7 is a flowchart illustrating a flow of processing by a second processing method during application (imaging) of the X-ray CT apparatus according to the second embodiment.

Next, a second processing method according to the second embodiment will be described with reference to FIG. 7. In the second processing method, the projection data division unit 141 divides the measurement data of the subject or the projection data such that the data amount included in the low-quality image for learning of the learned model 136 matches the data amount included in the CT image (low-quality image) reconstructed by the low-quality image generation unit 142.

Step S010

In the storage device 123 of the X-ray CT apparatus 1, a representative data amount of the input data (low-quality image) when the learned model 136 is generated, for example, the number of views a, is stored in advance. The projection data division unit 141 acquires the data amount of the projection data of the subject acquired by the scan gantry unit 100, for example, the number of views J.

In step S010, the projection data division unit 141 calculates the number of divisions N according to the following equation such that the data amounts of the input data during learning and during application are aligned.

$N = J/a$

N is rounded off or the like so as to be an integer.

Step S011

In step S011, the projection data division unit 141 divides the projection data of the subject into N pieces. The partial projection data of $n = 0, 1, \ldots, N-1$ are equally divided so as to have, for example, view numbers of $j_n = n, N+n, 2N+n, \ldots$. When N is equal to or less than 1, the division is not performed and the first embodiment may be performed. FIG. 7 is an example of a case where N=2.

Steps S012 to S014

Steps S012 to S014 and subsequent steps are the same as the first implementation method of the second embodiment, and thus description thereof is omitted.

In the X-ray CT apparatus according to the second embodiment, since the data amounts of the input data to the learned model 136 during learning and during application are the same, the noise and artifact can be reduced with high accuracy.

THIRD EMBODIMENT

An X-ray CT apparatus according to a third embodiment will be described.

In the third embodiment, the projection data division unit 141 divides measurement data of a subject or projection data such that a noise amount included in a low-quality image used for learning of the learned model 136 matches a noise amount included in a CT image (low-quality image) reconstructed by the low-quality image generation unit 142.

Specifically, the projection data division unit 141 includes a prediction unit (not illustrated) that predicts a noise amount obtained when an image is reconstructed from the projection data (not divided) of the subject. The projection data division unit 141 determines the number of divisions N of the measurement data of the subject or the projection data such that the predicted noise amount matches the noise amount of the low-quality image used for learning of the learned model 136 based on the noise amount predicted by the prediction unit.

In general, image noise can take various values due to differences in imaging conditions and reconstruction conditions such as physique of the subject, an imaging site, a structure in the subject, a dose, a slice thickness, and a reconstruction filter. If there are sufficient computational resources during learning, for example, tens or more types of learned models 136 may be created for each slice thickness or each reconstruction filter on an assumption of all conditions in application, but in reality, machine learning takes a lot of processing time due to limit of the computational resources, and thus it is realistic to create the learned model 136 with one to at most a few representative conditions. Therefore, the image noise of the input data during creation of the learned model 136 and the image noise of the input data during application may greatly differ.

When the noise amounts of the input data of the learned model 136 during learning and during application are different, noise reduction performance and artifact reduction performance may deteriorate during application, and unexpected deterioration in image quality may occur. Therefore, in the third embodiment, the noise amounts of the input data during learning and during application are aligned as much as possible.

Configuration According to Third Embodiment

A configuration of the X-ray CT apparatus according to the third embodiment is the same as that in FIG. 5. However, the projection data division unit 141 includes a prediction unit (not illustrated) that predicts a noise amount obtained when an image is reconstructed from the projection data (not divided) of the subject.

During Application According to Third Embodiment

Operations during application of the X-ray CT apparatus according to the third embodiment will be described with reference to a flow in FIG. 8.

Step S020

A representative image noise amount or variance value of the input data (low-quality image) when the learned model 136 is generated, for example, an image noise amount $\sigma_1$ or a variance value $\sigma_1^2$ of a first low-quality image, is stored in the storage device 123 of the X-ray CT apparatus 1 in advance.

The prediction unit predicts an image noise $\sigma_x$ or a variance value $\sigma_x^2$ obtained when an image is reconstructed from the projection data (not divided) of the subject during application. Here, as a prediction method for predicting the image noise or the variance value, a known CT auto exposure control (CT-AEC) method may be used, and for example, a method described in JP4731151 is used.

In step S020, the projection data division unit 141 calculates the number of divisions N such that a noise amount of input data (low-quality image) during learning of the learned model 136 and a noise amount obtained when image reconstruction is performed on the projection data (not divided) of the subject during application are aligned. Specifically, the number of divisions N is calculated by the following equation from $\sigma_1^2$ and $\sigma_x^2$.

$$N = \sigma_2^2/\sigma_x^2$$

N is rounded off or the like so as to be an integer.

Steps S011 to S014

Steps S011 to S014 are the same as those in the second embodiment, and description thereof will be omitted.

Figure 8:
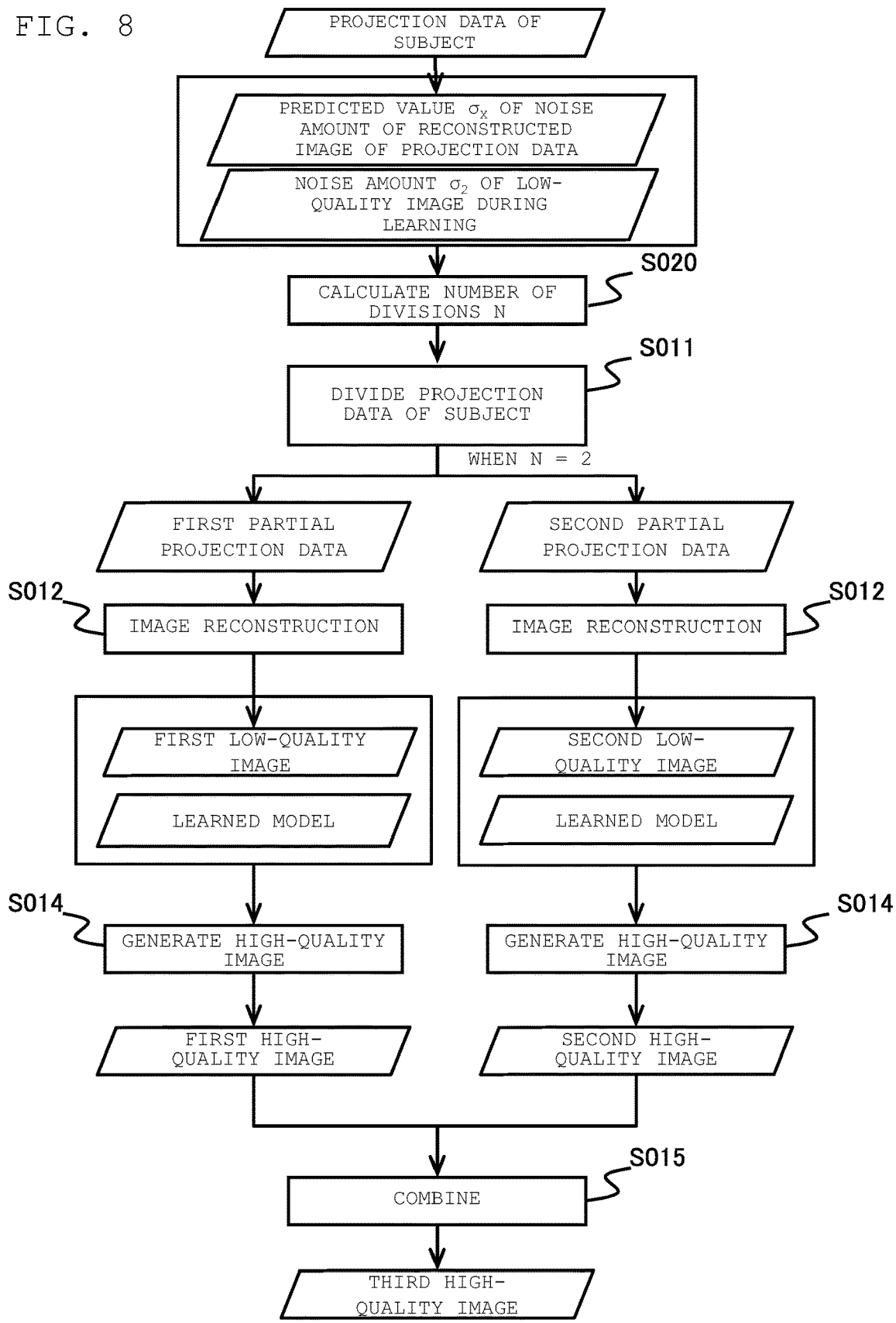
FIG. 8 is a flowchart illustrating a flow of processing during application (imaging) of an X-ray CT apparatus according to a third embodiment.

The flow in FIG. 8 is an example of a case where the number of divisions N is 2.

In the X-ray CT apparatus according to the third embodiment, since the noise amounts of the input data during learning and during application of the learned model 136 are aligned, an X-ray CT apparatus that can reduce the noise and artifact with high accuracy can be provided.

FOURTH EMBODIMENT

An X-ray CT apparatus according to a fourth embodiment will be described.

The X-ray CT apparatus according to the fourth embodiment has the same configuration as that of the X-ray CT apparatus according to the second embodiment, but is different from the X-ray CT apparatus according to the second embodiment in that a difference image of a low-quality image is used as additional data during learning and during application of the learned model 136.

As disclosed in known U.S. Pat. No. 7,706,497 and JP6713860, projection data is subjected to even-odd division, image reconstruction is performed, and a difference between two images is taken, so that a noise image excluding a signal can be obtained.

In the fourth embodiment, by inputting the difference image (noise image) as additional data for machine learning to the model, noise reduction accuracy of the learned model 136 is improved.

Configuration According to Fourth Embodiment

Figure 9:
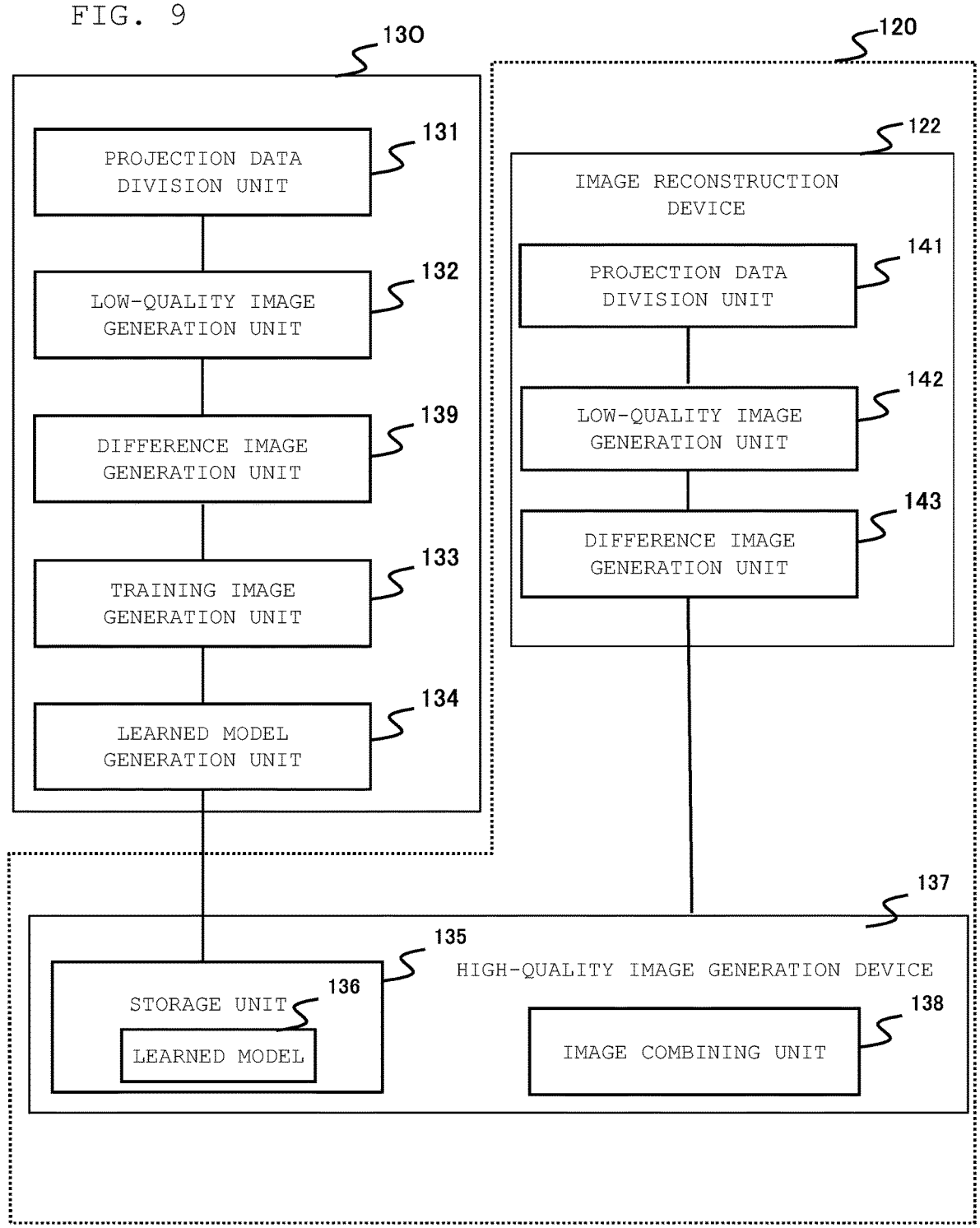
FIG. 9 is a block diagram illustrating configurations of the learned model generation device 130, the image reconstruction device 122, and the high-quality image generation device 137 according to a fourth embodiment.

FIG. 9 shows a configuration of the X-ray CT apparatus according to the fourth embodiment. The X-ray CT apparatus according to the fourth embodiment has a similar configuration to that of the apparatus according to the second embodiment, but is different from the apparatus according to the second embodiment in that a difference image generation unit 139 is provided in the learned model generation device 130 and a difference image generation unit 143 is disposed in the image reconstruction device 122.

During Learning of X-ray CT Apparatus According to Fourth Embodiment

Figure 10:
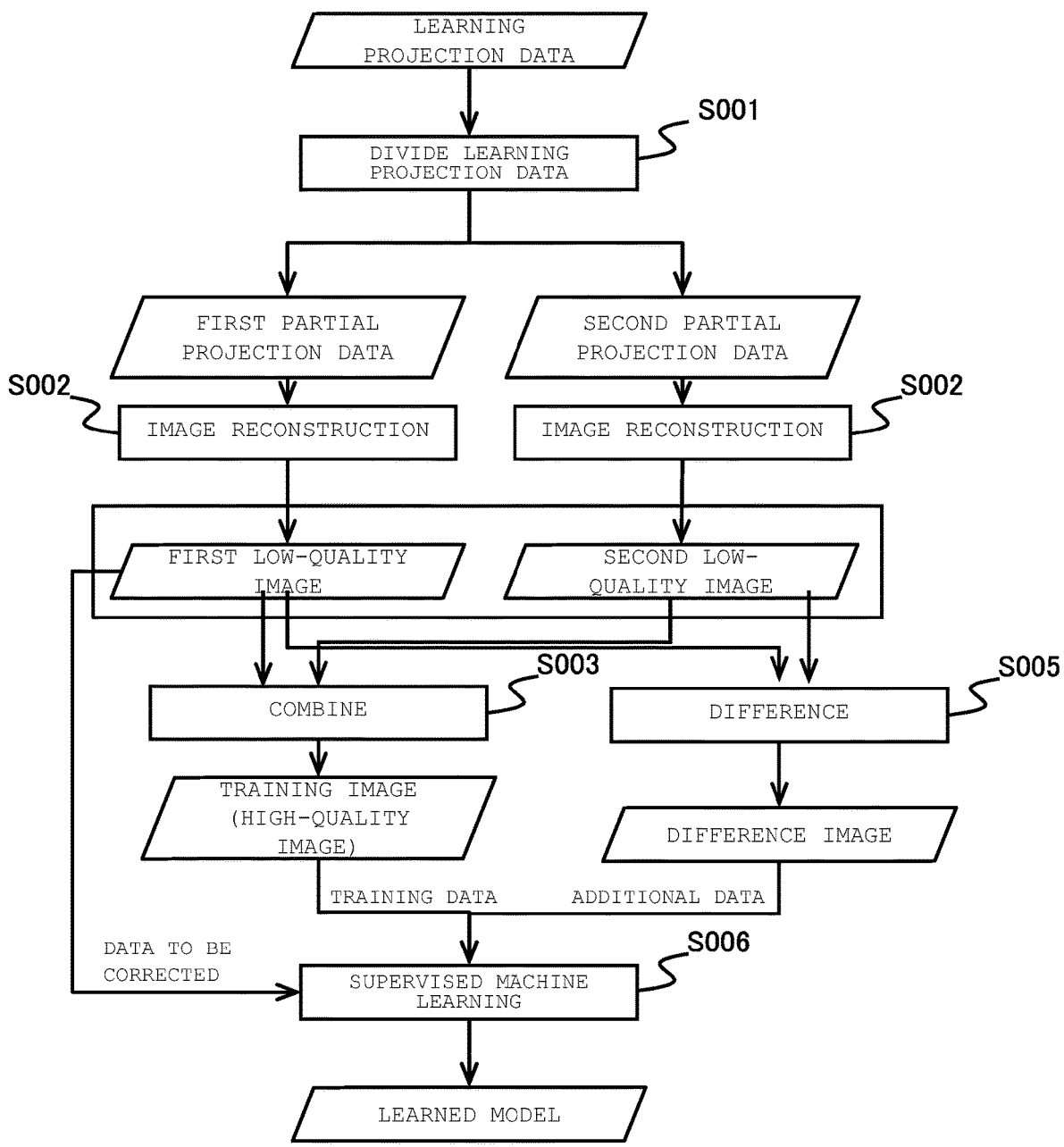
FIG. 10 is a flowchart illustrating a flow of processing during learning of a model of an X-ray CT apparatus according to the fourth embodiment.

Operations during learning of the model according to the fourth embodiment will be described with reference to FIG. 10.

Step S001

In step S001, the projection data division unit 131 performs even-odd division on learning projection data to obtain first partial projection data and second partial projection data.

Steps S002 and S003

Steps S002 and S003 are the same as those in the first embodiment, and the low-quality image generation unit 132 generates a first low-quality image and a second low-quality image from the first partial projection data and the second partial projection data. The training image generation unit 133 combines the first low-quality image and the second low-quality image to obtain a high-quality image (training image).

Step S005

On the other hand, in step S005, the difference image generation unit 139 obtains a difference between the first low-quality image and the second low-quality image to generate a difference image. Since images of a learning subject included in the first low-quality image and the second low-quality image are substantially at the same cross-sectional position, the difference image is an image of only noise.

Step S006

In step S006, one of the first and second low-quality images is set as input data, the training image is set as training data, and the difference image is set as additional data, and supervised machine learning is performed. In machine learning, as described in the first embodiment, for example, a known convolutional neural network (CNN) is used. The CNN includes an input layer for inputting at least one image, an intermediate layer, and an output layer for outputting at least one image. When the input data, the training data, and the difference image are input, the intermediate layer constructs a network (learned model 136) such that the output image approaches the training data, that is, a difference between the output image and the training data becomes small. By the machine learning, the learned model 136 that reduces image noise and an artifact can be generated. Since the difference image includes information on noise distribution for each pixel, the learned model 136 that can remove noise components with higher accuracy while leaving signal components by adding the difference image is obtained.

During Application of X-ray CT Apparatus According to Fourth Embodiment

Figure 11:
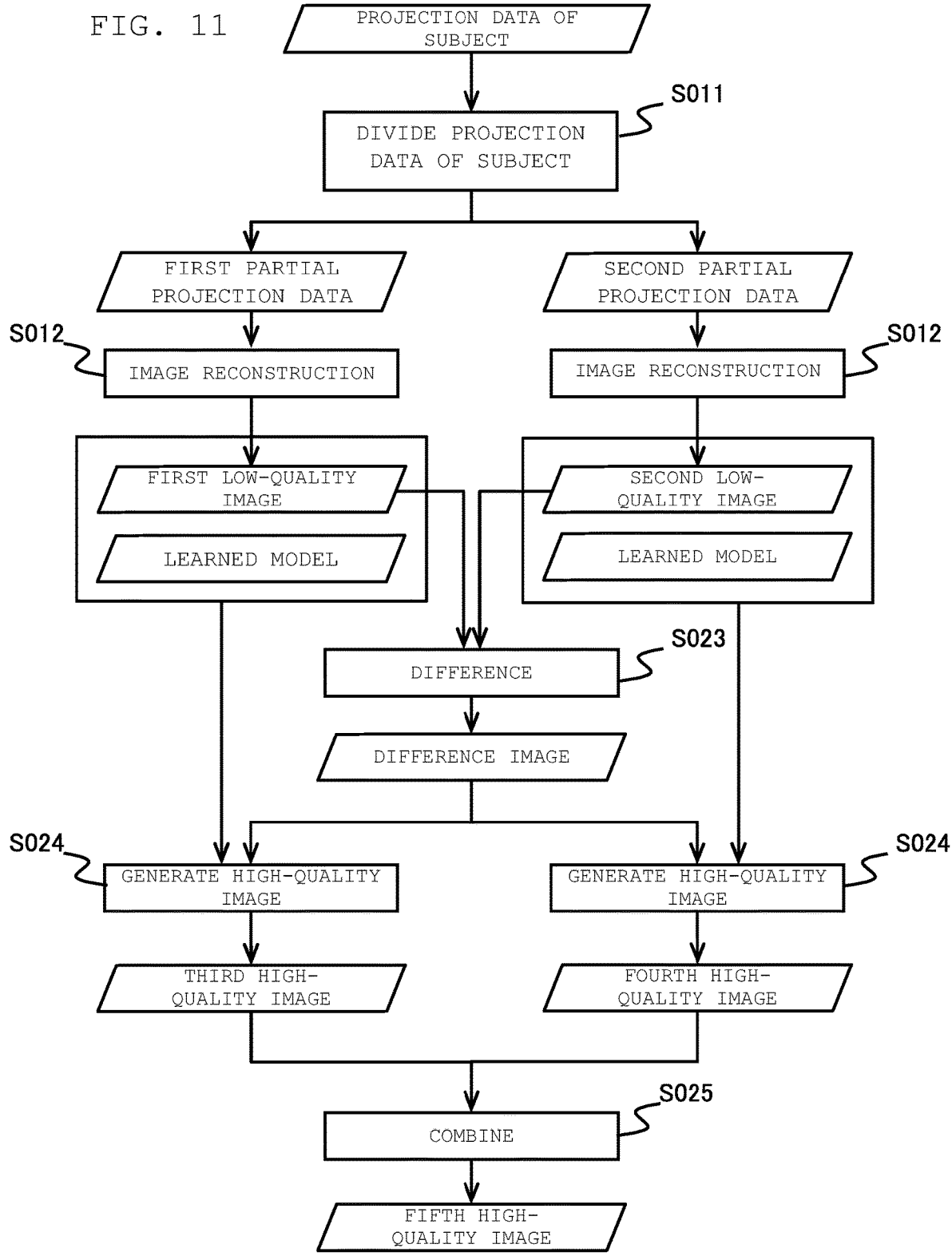
FIG. 11 is a flowchart illustrating a flow of processing during application (imaging) of the X-ray CT apparatus according to the fourth embodiment.

Operations during application according to the fourth embodiment will be described with reference to FIG. 11.

Step S006

In step S011, the projection data division unit 141 performs even-odd division on projection data of the subject to obtain first partial projection data and second partial projection data.

Step S012

In step S012, the low-quality image generation unit 142 performs image reconstruction on the first partial projection data and the second partial projection data, respectively, to obtain a first low-quality image and a second low-image-quality image.

Step S023

In step S023, the difference image generation unit 143 obtains a difference between the first low-quality image and the second low-quality image to generate a difference image.

Step S024

In step S024, the first low-quality image and the difference image are input to the learned model 136 as input data and additional data, respectively, and a third high-quality image with reduced noise is acquired. Similarly, the second low-quality image and the difference image are input to the learned model 136 as input data and additional data, and a fourth high-quality image with reduced noise is generated.

Step S025

In step S025, the third high-quality image and the fourth high-quality image are combined to generate a fifth high-quality image. As a combining method, for example, weighted average similar to (Equation 3) to (Equation 5) is used.

According to the fourth embodiment, an X-ray CT apparatus that can accurately reduce only noise by adding a difference image reflecting noise components as additional data for machine learning can be provided.

Although the preferred embodiments of the X-ray CT apparatus according to the invention have been described above, the invention is not limited to the above-described embodiments. In addition, it is obvious that a person skilled in the art can conceive of various modifications or correction examples within the scope of the technical ideas disclosed in this application, and it is understood that these also belong to the technical scope of the invention.

What is claimed is:

1. An X-ray CT apparatus comprising:
a scan gantry unit configured to rotate an X-ray source and an X-ray detector around a subject in a state in which the X-ray source and the X-ray detector face each other with the subject interposed therebetween, and acquire measurement data output by the X-ray detector by detecting X-rays emitted from the X-ray source and transmitted through a subject;
an image reconstruction unit configured to generate a CT image of the subject by using the measurement data; and
a high-quality image generation unit including a learned model and configured to obtain a high-quality image output by the learned model by receiving the CT image reconstructed by the image reconstruction unit and inputting the CT image to the learned model,
wherein the learned model is a model after learning, and in said learning, in which at least one low-quality image generated in advance is input data, and at least one high-quality image higher in image quality than the at least one low-quality image is training data,
wherein the at least one low-quality image and the at least one high-quality image are obtained based on same learning measurement data or learning projection data obtained by logarithmically converting the learning measurement data, and the learning measurement data is data output by a learning X-ray detector by detecting X-rays emitted from a learning X-ray source and transmitted through a learning subject, the learning X-ray source and the learning X-ray detector being rotated around the learning subject in a state in which the learning X-ray source and the learning X-ray detector face each other with the learning subject interposed therebetween, and
wherein each of the at least one low-quality image is a CT image reconstructed from data obtained by extracting partial data obtained by dividing from the learning measurement data or the learning projection data in any one of a view direction, a column direction, and a channel direction of the learning X-ray detector, and each of the at least one high-quality image is a CT image obtained by reconstructing the learning projection data.

2. The X-ray CT apparatus according to claim 1, wherein each of the at least one low-quality image is a CT image obtained by reconstructing a selected data which is selected an even number or an odd number of pieces of data from the learning measurement data or the learning projection data in any one of the view direction, the column direction and the channel direction.

3. The X-ray CT apparatus according to claim 1, wherein each of the at least one high-quality image is an image obtained by synthesizing a plurality of CT images obtained by reconstructing divided data obtained by dividing the learning measurement data or the learning projection data into a plurality of pieces.

4. The X-ray CT apparatus according to claim 1, wherein the measurement data acquired by the scan gantry unit is used as the learning measurement data.

5. The X-ray CT apparatus according to claim 1, wherein the image reconstruction unit includes a division unit configured to divide the measurement data or projection data obtained by logarithmically converting the measurement data, and reconstructs a CT image from divided partial data, and
the high-quality image generation unit obtains the high-quality image output by the learned model by inputting the CT image reconstructed from the divided partial data to the learned model.

6. The X-ray CT apparatus according to claim 5, wherein the image reconstruction unit selects partial data from the measurement data or the projection data in any one of a view direction, a column direction, and a channel direction, and generates a reconstructed CT image with the selected partial data.

7. The X-ray CT apparatus according to claim 5, wherein the measurement data of the subject or the projection data is divided under the same condition as when the learning measurement data or the learning projection data is divided during generation of the at least one low-quality image for learning of the learned model.

8. The X-ray CT apparatus according to claim 5, wherein the division unit divides the measurement data of the subject or the projection data such that a noise amount included in the at least one low-quality image used for learning of the learned model and a noise amount included in the CT image reconstructed by the image reconstruction unit match with each other.

9. The X-ray CT apparatus according to claim 8, wherein the division unit includes a prediction unit configured to predict the noise amount included in the CT image reconstructed by the image reconstruction unit, and determines a division number of the measurement data of the subject or the projection data based on the noise amount predicted by the prediction unit.

10. The X-ray CT apparatus according to claim 1, wherein the learned model is learned by using a learning noise image as input data in addition to the at least one low-quality image, the learning noise image is a difference image of two learning CT images obtained by reconstructing data obtained by dividing the learning measurement data or the learning projection data into two pieces, respectively, the image reconstruction unit includes a noise image generation unit configured to generate a noise image from the measurement data or projection data, the noise image generation unit reconstructs the data obtained by dividing the measurement data or the projection data obtained by logarithmically converting the measurement data into two pieces, respectively, and generates the difference image of the two obtained CT images as the noise image, and the high-quality image generation unit obtains the high-quality image output by the learned model by receiving the CT image reconstructed by the image reconstruction unit and the noise image and inputting the CT image and the noise image to the learned model.

11. A high-quality image generation device comprising:

a learned model, wherein the high-quality image generation device obtains a high-quality image output by the learned model by receiving a subject CT image and inputting the subject CT image to the learned model, the learned model is a model after learning, and in said learning, at least one low-quality image generated in advance is input data, and at least one high-quality image higher in image quality than the low-quality image is training data, and the subject CT image input to the learned model is an image generated such that a noise amount matches with a noise amount of the at least one low-quality image used as input data during learning of the learned model, and each of the at least one low-quality image is a CT image reconstructed from data obtained by extracting partial data from learning measurement data or learning projection data in any one of a view direction, a column direction, and a channel direction.

12. A high-quality image generation device comprising:

a division unit configured to divide measurement data of an X-ray CT apparatus or projection data obtained by logarithmically converting the measurement data;

an image reconstruction unit configured to reconstruct a CT image from divided partial data, and a learned model configured to be a model after learning, wherein in said learning, at least one low-quality image generated in advance is input data, and at least one high-quality image higher in image quality than the at least one low-quality image is training data, and wherein a high-quality image output by the learned model is obtained by inputting the CT image reconstructed by the image reconstruction unit from the partial data divided by the division unit to the learned model, and wherein each of the at least one low-quality image is a CT image reconstructed from data obtained by extracting partial data from learning measurement data or learning projection data in any one of a view direction, a column direction, and a channel direction.

* * * * *